United States Patent Office 3,221,062
Patented Nov. 30, 1965

3,221,062
NITRATION PROCESS
Oscar L. Wright, 5138 Tracy Ave., Kansas City 10, Mo.
No Drawing. Filed June 19, 1964, Ser. No. 376,568
7 Claims. (Cl. 260—622)

This invention relates to the nitration of aromatic compounds. More particularly it relates to nitration reactions wherein more than one reaction product is ordinarily obtainable.

In the manufacture of nitro-aromatic compounds by nitration of various aromatic substrates it often occurs that a mixture of nitrated products is formed, necessitating expensive or troublesome purification procedures. By way of illustration, the production of 1-nitronaphthalene has always been handicapped by the formation of 5–6 percent of the 2-isomer. This isomer is difficult and costly to separate from the 1-form and, for many reasons, cannot be left in the reaction mixture. Reduction to the amine is one of the subsequent steps which makes use of this valuable intermediate, and, among the disadvantages of the presence of small amounts of the 2-isomer, is the carcinogenic nature of 2-naphthylamine.

The dinitration of naphthalene has always yielded a 3:2 ratio of 1,8-dinitronaphthalene to 1,5-dinitronaphthalene regardless of the varied conditions of the reaction or the nitrating agent employed. One disclosure claims a reversal of this ratio (U.S. Patent No. 2,948,759, August 9, 1960). 1,5-dinitronaphthalene is an intermediate in the formation of the 1,5-diisocyanate, which is used in cross-linking certain polymers. The 1,8-isomer is not suitable for this purpose, nor is the mixture of 1,8- and 1,5- which results from nitration. A rather costly separation of the two is necessary.

I have discovered a method of nitration having broad applicability which by way of illustration, produces 1-nitronaphthalene with substantially non of the 2-nitro isomer, and which, when used in the dinitration of naphthalene, produces the 1,5-dinitronaphthalene with substantially none of the 1,8-isomer.

This method involves the use of nitric acid, either as such, or formed in situ, either in the presence or absence of another strong acid, and in the presence of a solvent, which when protonated, will effectively block the most available position on the aromatic nucleus in a temporary manner. Nitro substitution then takes place on one or more positions on the aromatic nucleus which are normally less available. The product obtained is a complex composition possessing both nitro substituents and easily removable substituents derived from the protonated solvent. The reaction product may be easily decomposed and the solvent removed by a water wash, or by distillation or a combination of these treatments. Decomposition of the reaction product yields the desired nitro-substituted aromatic compound.

Suitable solvents which can be protonated may be selected from compounds which contain as functional groups either carbonyl or cyano structures. Depending upon the nature of the rest of the molecule the carbonyl or cyano group may have differing degrees of activity when protonated. Some of these compounds are much more difficult to protonate than others; some protonate so exothermally as to cause them to boil. I have found that aliphatic nitriles are particularly suitable for use in this process. Acetonitrile is an especially good choice because it is a small molecule which is readily protonated, rendering it capable of attacking aromatic substrates at a number of positions. Furthermore the boiling point (around 80° C.) is especially convenient in controlling reaction temperatures.

Briefly, the process may be summarized as comprising the steps:

(a) Reacting together
(1) An aromatic substrate which is capable of being nitrated in at least two positions,
(2) A compound corresponding to the formula R—C≡N in which R is alkyl,
(3) A protonating agent and
(4) A nitrating agent to yield an intermediate reaction product and (b) Decomposing the intermediate reaction product of step (a) to yield a nitro-aromatic compound.

The principles on which the process is based, as well as suitable specific procedures, are presented below by discussion and by means of illustrative examples.

Many chemical agents are known to attack an aromatic ring when protonated. Formaldehyde, when protonated with hydrogen chloride, is capable of attacking the ring to form chloromethylated aromatics. Carbon monoxide, protonated with hydrogen chloride and HCN, protonated with hydrogen chloride, will also attack the ring in the presence of a Lewis acid. Acetonitrile, when protonated, will also attack certain activated aromatic systems to form a permanent attachment to the ring. For example, acetylresorcinol may be made by this route.

In all the above reactions, however, the connection is made on a permanent basis, and although some of these reactions are known to have some tendency toward reversibility, no use of such reversibility has ever been disclosed in order to control the course of a competing reaction. The reactions themselves are so well-known that they are included in the basic elementary texts in organic chemistry.

According to the presently accepted acid-base theory, such solvents are Bronsted-Lowry bases, capable of accepting a proton in a strongly protonating medium. As a result of such protonation they become electrophiles which I have discovered are capable of attacking an active position on an aromatic nucleus and when employed in the presence of another reagent, which is also capable of attacking the ring, act as competing reagents, blocking one or more of the reaction sites.

The use of such solvents retards reactions considerably, as would be anticipated, since the more active positions would be effectively blocked. Another reason why the reaction would be slowed down is the formation of the main active attacking electrophile, as follows:

In the nitration of an aromatic substrate it is the generally accepted theory that nitric acid reacts with a protonating agent forming an electrophile, either the nitronium ion or the nitricidium ion, which subsequently attacks the ring. In most nitration processes a protonating agent such as sulfuric acid is used in combination with nitric acid. A primary reaction takes place in which a strong electrophile is formed which subsequently attacks the ring.

If a solvent is present, also capable of being protonated and of attacking the aromatic nucleus, such protonation will be a competing reaction to any other protonation taking place at the same time. This type of reaction would tend to retard any other protonating reaction taking place simultaneously.

These considerations seem to be the most logical explanation for the reaction which I have observed. A considerable amount of evidence has been collected to support such a theory. What I have observed, however, I consider to be novel, i.e., displaced orientation effects during nitration reactions, which give more desirable ratios of nitration products, and hence are of great commercial value. I do not wish to be limited by the reaction mechanism taught, but I would disclose processes for performing those reactions wherein such commercial advantages can be obtained.

The solvent for use in these reactions may be chosen from several possibilities. Any solvent capable of being protonated to form an electrophile will work in the reaction, some much better than others. The electrophile can be a weak or a strong attacking agent. Some of the strong attacking agents have the disadvantage of being too readily removed, and some too weak to form a linkage capable of blocking a position. The type of solvent capable of being protonated is one in which a carbon atom is linked by an unsaturated linkage to either a nitrogen or an oxygen atom. The N or O atom is protonated and the plus charge shifts to the carbon atom.

When acetonitrile is used as a solvent, the protonation takes place as follows: the nitrogen atom is protonated and the triple bond changes to a double bond. The plus charge is transmitted to the carbon atom and the C—C—N bond angle, formerly 180°, is changed to 120° due to the formation of the double bond. The resulting electrophilic ion is now sterically capable of attacking the electron cloud of the aromatic ring and it attacks at the position of highest electron availability when that position is not sterically hindered.

Other solvents will act with a similar mechanism. Methyl acetate, for instance, can be protonated on the carbonyl oxygen, forming a carbonium ion which has no double bond. Due to the fact that there are three substituents on the carbon atom having the plus charge, for steric reasons it would not be anticipated that this solvent would be as effective in attacking the aromatic nucleus as acetonitrile. Other nitriles are easy to protonate, of course. These solvents are capable of being active in such a system depending upon other factors such as solubility and the steric effects of the alkyl group attached to the carbon atom carrying the plus charge. Even acetic acid as a solvent is capable of protonation and, as such, has activity in blocking some aromatic positions. Some minor variations have been observed during nitration in acetic acid as a solvent.

Of the various solvents tested, acetonitrile appears to be the most adequate solvent for most nitration reactions. It appears to be a practical material to use for other reasons (1) it is readily available commercially; (2) it has a boiling point at a good range for the reaction to take place, and its boiling and condensing serves as an excellent method for the moderation of the exotherm usually observed; (3) it is readily reclaimed from the reaction mass by distillation and last traces can be washed out with either cold water or steam.

The reaction can be demonstrated using many techniques and many varied reaction procedures. An aromatic substrate can be nitrated by mixing acetonitrile with the aromatic substrate and adding nitric acid alone or mixed with acetonitrile. The temperature of the reaction can be controlled, and the speed of the reaction can be moderated by the amount of acetonitrile used. The reaction can also be run in the presence of small amounts of sulfuric acid, where the aromatic substrate is less active or where dinitration is desired. Large amounts of sulfuric acid, usually employed in mixed acid nitrations, are not necessary. The nitric acid can be formed in situ by mixing the aromatic substrate, acetonitrile and an inorganic nitrate salt and adding sulfuric acid dropwise to the mixture. The type and amount of solvent utilized in specific nitrations depends upon the aromatic substrate to be nitrated, i.e., whether it is a very active substrate (such as phenol) or a relatively inactive one (such as ethylbenzene).

Nitrating agents such as nitric acid alone, "mixed acid" (a combination of nitric and sulfuric acids), acyl nitrates or any of those commonly used in nitration reactions may be employed.

Nitric acid alone will act both as a protonating agent and a nitrating agent. In some cases, however, the reaction is quite slow unless another protonating agent is employed. Sulfuric acid is very effective in such a capacity. Any other acid of comparable acid strength may be used to effect protonation of the solvent.

Some substrates, e.g., phenol and durene, ordinarily too susceptible to oxidation to be nitrated directly, are relatively easy to mononitrate. For example, phenol is nitrated preferably in the ortho position. Mesitylene and durene are mononitrated with ease. Anthracene can be mononitrated also. Ratios of ortho to paranitrotoluene as high as 5.5:1 have been obtained during the nitration of toluene in acetonitrile solvent.

EXAMPLE 1

*The nitration of toluene in actonitrile*

A series of nitrations of toluene were run wherein toluene, 6.7 g., and acetonitrile, 33 ml., were mixed with a solution containing 33 ml. acetonitrile and 1.72 g. of 90% $HNO_3$ (d.=1.50). The resulting mixtures were homogeneus and no mixing was necessary. The solutions were placed in a constant temperature bath and samples were taken every 20 minutes until 7 samples had been taken. This same reaction was run at 35°, 40°, 50°, 60°, and 80° C. The samples were run in a gas-liquid chromatograph and the ratio of ortho- to paranitrotoluene was determined on each sample. Table I shows the data for the runs at different temperatures. The seven analyses for each run have been averaged and the average appears in the table.

TABLE I.—THE NITRATION OF TOLUENE IN ACETONITRILE WITH 90% $HNO_3$ AT SEVERAL TEMPERATURES WITH TOLUENE USED IN SLIGHT EXCESS

| Run No. | Temp., deg. | Average o/p ratio |
|---|---|---|
| 1 | 35 | 3.60 |
| 2 | 40 | 5.60 |
| 3 | 50 | 5.10 |
| 4 | 60 | 3.90 |
| 5 | 70 | 2.85 |
| 6 | 80 | 2.35 |

No attempt was made to determine the total yield in these reactions. The reactions are fairly slow; no dark color is developed as is the usual case during nitration; and except a small amount at 70° and at 80° C. no nitrogen dioxide fumes were evolved. Toluene was used in excess so that all the nitric acid would be used up, since it sometimes interferes with the gas chromatography. Samples from the reaction mixture were allowed to stand over anhydrous potassium carbonate for about one-half hour before analyzing.

EXAMPLE 2

*The nitration of toluene in acetic acid-acetic anhydride mixtures*

Toluene was nitrated in 50–50 by volume mixtures of acetic acid and acetic anhydride. A mixture containing 75 ml. acetic acid, 75 ml. of acetic anhydride and 18.2 ml. of toluene; and another solution consisting of 75 ml. of acetic acid, 75 ml. of acetic anhydride, and 5.4 g. of 90% nitric acid was made. Each of these solutions was diveded into six equal volumes of a little more than 25 ml. each. The two solutions, when mixed, formed homogeneous mixtures; no stirring was necessary. For the several runs the two solutions were mixed and placed in a constant temperature bath set in the separate reactions at 35°, 40°, 50°, 60°, and 70° (the 80° run was omitted). Samples were taken every 20 minutes until seven samples were taken. The average of the seven analyses (gas-liquid chromatography) for the five runs appears in Table II.

TABLE II.—THE NITRATION OF TOLUENE IN ACETIC ACID-ACETIC ANHYDRIDE MIXTURES, WITH 90% NITRIC ACID, AT SEVERAL TEMPERATURES, WITH THE TOLUENE USED IN EXCESS

| Run No. | Temp., deg. | Average o/p ratio |
|---|---|---|
| 1 | 35 | 1.52 |
| 2 | 40 | 1.86 |
| 3 | 50 | 1.78 |
| 4 | 60 | 1.75 |
| 5 | 70 | 1.74 |

No attempt was made to determine total yield. The samples were taken from the reaction mixture and run directly in the gas chromatograph. The reaction is assumed to be almost quantitative since no degradation products were observed and very little nitrogen dioxide fumes were seen.

EXAMPLE 3

*The nitration of toluene in chloroform*

Chloroform, 50 ml. was mixed with 5 g. of toluene and 0.9 g. of 90 % nitric was added dropwise. The mixture was then stirred at a given temperature for 1½ hours. The chloroform was removed from the product on the steam bath and the product was taken up in acetonitrile and analyzed in the gas chromatograph. Prior to analyzing the sample was contacted with 1–2 g. anhydrous potassium carbonate for about 30 minutes. Data for the four runs appears in Table III.

TABLE III.—THE NITRATION OF TOLUENE WITH 90% NITRIC ACID IN CHLOROFORM AT SEVERAL TEMPERATURES

| Run No. | Temp., deg. | Average o/p ratio |
|---|---|---|
| 1 | 25–30 | 1.45 |
| 2 | 35–40 | 1.62 |
| 3 | 45–50 | 1.52 |
| 4 | 55–60 | 1.41 |

EXAMPLE 4

*The nitration of naphthalene in acetonitrile*

A solution of 500 ml. acetonitrile and 200 g. (1.6 moles) naphthalene was made. The solution was endothermic; the temperature dropped below 20° C. even though a heating mantle was applied to warm up the mixture. Fuming nitric acid (120 g., 1.9 moles, 90%) was then added to the mixture. The temperature immediately rose within a minute from 20° to 70° and leveled off. When the temperature reached 80° the mixture was cooled by a cold water bath. There were *no* NO₂ fumes and no dark color developed in the reaction mixture. The color developed in the mixture went from a light yellow to a reddish orange as the reaction proceeded. The exotherm subsided after about 1 hour and the mixture was heated to reflux for 30 minutes more.

The reaction mass was poured into cold water and the naphthalene-nitronaphthalene mixture settled to the bottom and solidified overnight. The solid was washed with cold water and finally with hot water (product melted) to remove all the acetonitrile. Although some of the naphthalene separated and crystallized at the top of the water layer and was lost, the major product weighed 230 grams when dry.

Analysis was run on the product by gas chromatography. The solid product, dissolved in acetonitrile, showed the presence of acetonitrile, naphthalene and 1-nitronaphthalene, but the sensitivity of the instrument had to be multiplied by a factor of ten in order to detect the presence of the 2-isomer. Samples were also taken from the reaction mixture and analyzed in the gas chromatograph. There was nothing significantly different in these analyses except the presence of a small amount of something which came through the column between naphthalene and 1-nitronaphthalene. This was not due to impurities in the naphthalene, nor was it due to any other possible derivative tested. It might be due to some addition product of naphthalene and acetonitrile. The product disappeared with the water wash, however, and also disappeared with the removal of acetonitrile by distillation. It has not been identified.

EXAMPLE 5

*The dinitration (incomplete) of naphthalene*

Another nitration was begun using the same relative proportions of starting material as in Example 4 but employing only 16 g. of naphthalene. After the addition of 10 g. of nitric acid and the exotherm had run its course, another 10 g. of 90% nitric acid was added and sulfuric acid (100%) was added dropwise to the mixture until 10 g. had been added. The mixture reacted exothermically and refluxed gently. After thirty minutes the acetonitrile was distilled down so as to remove more than 90 percent of it. The molten product was then poured into cold water with stirring. The product solidified in small particles and was filtered and washed with cold water and then with hot water. A rough weight of this (wet) product was about 30 grams. The crude material was taken up in 100 ml. of boiling alcohol. Most of it went into solution. It was filtered and the melting range of the crude residue was 200–210° C. This solid material was recrystallized from acetic acid and yielded 3.2 g. of a crystalline product, white needles with a yellow-pinkish cast, which melted sharply at 216° C. (uncorrected). The alcohol solution was diluted with water after it had been previously chilled and the product was filtered and dried in a vacuum desiccator. This product melted sharply at 59° C.

These two products, the sole resulting material from the nitration, were identified as 1-nitronaphthalene, the main product, 23.5 g., and 1,5-dinitronaphthalene, 3.2 grams. Considering loss during recrystallization and based on the amount of naphthalene, this is very nearly a quantitative yield.

Based on these runs, a series of reactions were run again in smaller amounts, to determine the parameters of the reaction. Basically 16 g. of naphthalene were nitrated using 270 ml. of acetonitrile as solvent, with the plan to remove the acetonitrile by distillation after the nitration was complete. Nitric acid in varying stoichiometric ratios was used as a nitrating agent in one series of runs; nitric acid mixed with sulfuric, perchloric, or phosphoric was used in other series. In one series of runs ammonium nitrate solid was slurried into the reaction mass as concentrated sulfuric acid was added dropwise to the mixture. In the final series varying amounts of solvent were used with a constant amount of naphthalene and nitric acid.

Remarkably similar results were obtained in these runs. There were varying degrees of nitration depending upon the strength and relative amount of nitrating agent involved. In all cases the reagents were mixed and refluxed for an hour, after which the acetonitrile was distilled off and the reaction mass was immediately poured into water. No dinitration was observed, although it was not specifically sought. The analysis was made using gas chromatography and the ratio of 1-nitronaphthalene to the 2-nitronaphthalene was the objective. No more than 1% of the 2-isomer was found in any case, excepting those where the acetonitrile solvent was cut down to a very low quantity. The data for these runs will be found in the following tables.

TABLE IV.—THE NITRATION OF NAPHTHALENE WITH VARYING AMOUNTS OF NITRIC ACID USING 16 g. OF NAPHTHALENE AND 270 ml. OF ACETONITRILE AS SOLVENT

| Run No. | Grams of 90% HNO₃ | Solvent removed, ml. | Total yield of nitration products, percent | Amount of 2-isomer |
|---|---|---|---|---|
| 51 | 10.5 | 170 | 1-2 | None. |
| 54B | 21 | 245 | 8-10 | Do. |
| 55A | 18 | 245 | 5-6 | Do. |
| 55B | 15 | 250 | 3-4 | Do. |

TABLE V.—THE NITRATION OF NAPHTHALENE (16 g.) IN ACETONITRILE (270 ml.) WITH 90% NITRIC ACID (10.8 g.) AND VARYING AMOUNTS OF SULFURIC ACID

| Run No. | Solvent removed, ml. | Extent of nitration, percent | Amount of sulfuric, ml. | Content of 2-isomer, percent |
|---|---|---|---|---|
| 52A | 245 | 20 | 1 | Less than 0.5. |
| 52B | 260 | 25 | 2 | Do. |
| 53A | 255 | 30 | 3 | Do. |
| 54A | 245 | 34 | 5 | Do. |

TABLE VI.—THE NITRATION OF NAPHTHALENE (16 g.) IN ACETONITRILE (270 ml.) WITH 90% NITRIC ACID AND A PROTONATING ACID

| Run No. | Solvent removed, ml. | Extent of nitration | Amount of protonating acid | Content of 2-isomer |
|---|---|---|---|---|
| 56A | 235 | 3-4% | 1 ml. HClO₄ | Negligible. |
| 56B | 220 | 5.6% | 2 ml. HClO₄ | Do. |
| 57 | 240 | Less than 1% | 1 ml. H₃PO₄ | Do. |
| 58A | 235 | do | 2 ml. H₃PO₄ | Do. |

TAALE VII.—THE NITRATION OF NAPHTHALENE (16 g.) IN ACETONITRILE (270 ml.) WITH AMMONIUM NITRATE (10 g.) AND VARIABLE AMOUNTS OF SULFURIC ACID

| Run No. | Solvent removed, ml. | Extent of nitration, percent | Amount of sulfuric, ml. | Content of 2-isomer, percent |
|---|---|---|---|---|
| 58B | 250 | 1.2 | 10 | None. |
| 59 | 240 | Less than 1 | 5 | Do. |
| 60A | 225 | 20 | 15 | Do. |
| 60B | 225 | 40 | 25 | Negligible. |

EXAMPLE 6

The nitration of durene

Durene, 5.4 grams (.04 mole), was dissolved in 50 ml. of acetonitrile. An acetonitrile (10 ml.) solution of 90% nitric acid (2 ml., 3 g., .043 mole) was added to the durene solution. The reaction was gentle. It yellowed somewhat at room temperature. Upon taking it to reflux a yellow-orange color was developed, which intensified upon continuation for thirty minutes. At the end of this period a yellow-orange oil was formed when the reaction was poured into 250 ml. of cold water. The acetonitrile was not removed from the nitration mixture by the first wash, but required several washes to remove most of it. The product was extracted with ether and contained side chain oxidation products as well as the nitration products. These products were not identified other than to note that they were extracted by base, and that the color change, so characteristic of alpha-nitrated alkyl-aromatics, took place. When these products were removed, the remainder of the product solidified and was recrystallized from ethanol, M.P., 112–113° C. The yield of 3-nitrodurene was 2.8 grams, a little less than 40 percent. No durene and no dinitrodurene was reclaimed from the reaction mass.

The nitration of durene, according to Willstatter's mechanism (Berichte (1909), 42, 4151), takes place by adding the elements of nitric acid across the 3,6-positions in a way which obviates the formation of the mono-substituted durene derivative. Smith has stated (J. Am. Chem. Soc., (1926), 48, 1420), "In the nitration of durene no mononitrodurene is ever obtained. The nitration gives either unchanged durene or dinitrodurene, or oxidation products." Illuminati (J. Am. Chem. Soc. (1953), 75, 2159) suggested that the mononitration precedes the dinitration of durene but was able to isolate only a very small amount of the 3-nitrodurene. I believe that the normal nitration process takes place because of the formation of an intermediate complex composed of the mononitrated durene and durene which has a structure wherein the next available spot for nitration to occur is the 6-position on the mononitrated nucleus. I believe that the attack of the protonated acetonitrile on the durene nucleus prevents the formation of such a durene-nitrodurene complex, making it possible to obtain more of the mononitrated species. The color developed during Smith's procedure is not observed during the nitration in acetonitrile.

EXAMPLE 7

The nitration of mesitylene

Mesitylene, 6 g. (0.06 mole), was mixed with 50 ml. acetonitrile and to this mixture was added 3 ml., 4.5 g. (0.064 mole) of 90% nitric acid. The mixture was heated to reflux and held there for one-half hour, and then poured into 250 ml. of water and washed with two other 250 ml. portions of water. The product was taken up in ether and extracted with two 20-ml. portions of 5 percent sodium hydroxide solution and the ether was evaporated from the mixture. Even after standing several days this product did not solidify, nor did it solidify upon attempted recrystallization from aqueous alcohol. A small portion was dissolved in acetic acid, however, and about 20 ml. of an acetic acid solution of CrO₃ was added and the mixture was warmed for two hours on a hot water bath. A reaction took place as noted by color change. Upon pouring the mixture into ice water a small amount of solid material was reclaimed and was recrystallized from hot water and melted at 177–178° C. It was 4-nitro-3,5-dimethylbenzoic acid, the oxidation product of 2-nitromesitylene.

EXAMPLE 8

The nitration of phenol—A

A solution containing 2 g. (.021 mole) of phenol and 20 ml. of acetonitrile was mixed in a 500-ml., 3-necked, indented flask, equipped with a mechanical stirrer, reflux condenser, an addition funnel and a thermometer, while adding a second mixture dropwise. A cooling bath maintained the temperature at −5°–0° C., while the second mixture, composed of 30 ml. of acetonitrile and 2 ml. of 90% nitric acid (2.7 g. HNO₃, .042 mole) was added over a period of twenty minutes. The mixture was stirred for an additional hour as the temperature was maintained at less than 5° C. A sample, taken after the completion of the reaction and analyzed on the gas chromatograph, showed the presence of unreacted phenol, o-nitrophenol, and a small amount of 2,4-dinitrophenol.

The nitration of phenol—B

Phenol, 9.4 g. (0.1 mole), was mixed with 250 ml. of acetonitrile in a 500-ml., 3-necked flask, equipped with a mechanical stirrer, a reflux condenser, an addition funnel and a thermometer. The temperature of the mixture was maintained at −2° to +2° C. as a second mixture containing 8.5 g. of 90% nitric acid (0.13 mole) and 60 ml. of acetonitrile was added dropwise over a period of 45 minutes. After the addition the cooling bath was lowered and the temperature allowed to rise to 7–9° C. The reaction mixture was then poured into 300 ml. of ice water and allowed to stand overnight.

Two layers were formed overnight. The top one, a deep red, contained nitration products and acetonitrile, and the lower layer, a lighter red and aqueous, contained water and nitration products. Upon steam distillation, o-nitrophenol and acetonitrile were removed. The yield of o-nitrophenol was 7.3 grams (52.5 percent of the theoretical amount). When the residue was cooled 7.0 g. of dinitrophenol, melting at 109–11° C. was obtained. This product, only very slightly soluble in cold water, was 2,4-dinitrophenol, which on recrystallization melted at 113–114° C.

*The nitration of phenol—C*

Another nitration of phenol was carried out in exactly the same way as in reaction A, except that methyl acetate was used as solvent for the reaction. The product, analyzed in a gas chromatograph, showed the presence of a small amount of unnitrated phenol, and o- and p-nitrophenols in a ratio of o/p=1.67.

The literature states that the nitration of phenol in dilute nitric acid yields o- and p-nitrophenols in a one-to-one ratio (S. Veibel, Ber. (1930), 63, 160). Nitration in acetic acid yields o- and p-nitrophenols in a ratio of o/p=1.55 (F. Arnall, J. Chem. Soc. (1923), 123, 311 (1924), 125,811). Other investigators have observed variations in o/p ratio during the nitration of phenol, but the variations have been attributed to the presence of nitrogen dioxide and to a variation in the nitrating agent, or the presence of inorganic catalysts, but not to the different solvating effects of the solvents used. It has been observed that the reaction may be slowed down or speeded up by using different solvents, or by the addition of urea or nitrous acid. Considerable conflicting testimony in the literature exists concerning the mechanism of nitration in the presence of nitrous acid.

Nitrous acid is said to have an accelerating effect on the nitration of toluene and of phenol. Large excesses of nitrous acid tend to promote the formation of the para isomer during the nitration of phenol.

I have found that the use of acetonitrile slows down the nitration reaction, and that the formation of the ortho isomer is promoted.

What is claimed is:

1. A process for manufacturing a nitro-aromatic compound comprising the steps:
    (a) reacting together
        (1) an aromatic substrate which is capable of being nitrated in at least two positions,
        (2) a compound corresponding to the formula R—C≡N in which R is alkyl,
        (3) a protonating agent, and
        (4) a nitrating agent,
    to yield an intermediate reaction product, and
    (b) decomposing the intermediate reaction product of step (a) to yield a nitro-aromatic compound.

2. A process for manufacturing nitrotoluene comprising the steps:
    (a) reacting together
        (1) toluene,
        (2) acetonitrile, and
        (3) nitric acid to yield an intermediate reaction product, and
    (b) decomposing the intermediate reaction product of step (a) to yield o- and p-nitrotoluene, the molar ratio of ortho to para being more than 2.0.

3. A process for manufacturing 1-nitronaphthalene comprising the steps:
    (a) reacting together
        (1) naphthalene,
        (2) acetonitrile, and
        (3) nitric acid to yield an intermediate reaction product complex, and
    (b) decomposing the intermediate reaction product of step (a) to yield 1-nitronaphthalene substantially free from 2-nitronaphthalene.

4. A process for manufacturing 3-nitrodurene comprising the steps:
    (a) reacting together
        (1) durene,
        (2) acetonitrile, and
        (3) nitric acid to yield an intermediate reaction complex, and
    (b) decomposing the intermediate reaction product complex of step (a) to yield 3-nitrodurene.

5. A process for manufacturing 2-nitromesitylene comprising the steps:
    (a) reacting together
        (1) mesitylene,
        (2) acetonitrile, and
        (3) nitric acid to yield an intermediate reaction product complex, and
    (b) decomposing the intermediate reaction product of step (a) to yield 2-nitromesitylene.

6. A process for nitrating phenol comprising the steps:
    (a) reacting together
        (1) phenol,
        (2) acetonitrile, and
        (3) nitric acid to yield an intermediate reaction product, and
    (b) decomposing the intermediate reaction product complex of step (a) to yield o-nitrophenol and 2,4-dinitrophenol substantially free from p-nitrophenol.

7. A process for manufacturing dinitronaphthalene comprising the steps:
    (a) reacting together
        (1) naphthalene,
        (2) acetonitrile, and
        (3) nitric acid to yield an intermediate reaction complex, and
    (b) decomposing the intermediate reaction product complex of step (a) to yield 1,5-dinitronaphthalene substantially free from 1,8-dinitronaphthalene.

References Cited by the Examiner

Topchiev: Nitration of Hydrocarbon and Other Organic Compounds, Pergamon Press, New York, 1959, pp. 288 to 290.

CARL D. QUARFORTH, *Primary Examiner*.